United States Patent
Ishii

(10) Patent No.: US 7,142,248 B2
(45) Date of Patent: Nov. 28, 2006

(54) VIDEO SIGNAL PROCESSING APPARATUS AND METHOD, VIDEO DISPLAY APPARATUS

(75) Inventor: Satoyuki Ishii, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 10/805,533

(22) Filed: Mar. 22, 2004

(65) Prior Publication Data
US 2005/0007491 A1    Jan. 13, 2005

(30) Foreign Application Priority Data
Apr. 28, 2003    (JP)    ............... 2003-124119

(51) Int. Cl.
*H04N 7/01*    (2006.01)
(52) U.S. Cl. ............................................. 348/452
(58) Field of Classification Search ................ 348/441, 348/452, 448, 459, 458, 451, 699–701
See application file for complete search history.

(56) References Cited

U.S. PATENT DOCUMENTS

| | | | | |
|---|---|---|---|---|
| 5,036,393 | A | * | 7/1991 | Samad et al. ............... 348/452 |
| 5,410,356 | A | * | 4/1995 | Kikuchi et al. ............. 348/452 |
| 5,619,273 | A | * | 4/1997 | Sugiyama ................... 348/452 |
| 6,509,930 | B1 | * | 1/2003 | Hirano et al. ............... 348/452 |
| 6,900,846 | B1 | * | 5/2005 | Lee et al. .................... 348/459 |

FOREIGN PATENT DOCUMENTS

| | | |
|---|---|---|
| JP | 5-110997 | 4/1993 |
| JP | 2001-24987 | 1/2001 |
| JP | 2001-54075 | 2/2001 |
| JP | 2003-32636 | 1/2003 |

* cited by examiner

*Primary Examiner*—Paulos M. Natnael
(74) *Attorney, Agent, or Firm*—Pillsbury Winthrop Shaw Pittman, LLP

(57) ABSTRACT

A video signal processing apparatus comprising a motion vector detecting section detecting a video motion vector from current-field and pre-field video signals or video signal before and after one field of the current-field video signal, a first interpolation signal generating section displacing the pre-field video signal at a unit of block in accordance with the motion vector to generate a first interpolation signal, a second interpolation signal generating section adding the current-field video signal to a vertical high-band component of the first interpolation to generate a second interpolation signal, a comparison reference signal generating section generating a comparison reference signal from the current-field video signal, and an output control section controlling the output of first and second interpolation signals based on a correlation between first and second interpolation signals and the comparison reference signal.

15 Claims, 7 Drawing Sheets

VIDEO SIGNAL PROCESSING APPARATUS AND METHOD, VIDEO DISPLAY APPARATUS

CROSS-REFERENCE TO RELATED APPLICATIONS

This application is based upon and claims the benefit of priority from prior Japanese Patent Application No. 2003-124119, filed Apr. 28, 2003, the entire contents of which are incorporated herein by reference.

BACKGROUND OF THE INVENTION

1. Field of the Invention

The present invention relates to improvement in video signal processing apparatus and method, which convert an interlaced scanning video signal into a progressive scanning video signal. In addition, the present invention relates to a video display apparatus using the video signal processing apparatus.

2. Description of the Related Art

As publicly known, a progressive scanning converter circuit has been developed in order to convert a 2:1-interlaced scanning video signal into a progressive scanning video signal (non-interlaced signal). In order to convert the interlaced scanning video signal into the progressive scanning video signal, scanning lines must be interpolated on every other line. Motion adaptive processing and motion compensation processing have been proposed as the foregoing interpolation.

In the processing described above, there has been proposed a motion-adaptive progressive scanning converter circuit. The converter circuit inputs an input video signal and a video signal before one frame to a motion detection circuit to detect motion from the difference between two video signals. Thereafter, the converter circuit makes the following interpolations in still and moving image (picture) portions in accordance with the motion detection result. In the still image portion, scanning line interpolation (inter-field interpolation) is made using a video signal before one field. In the moving image portion, the means value between neighboring scanning lines is detected from input video signal and a video signal before one line. By doing so, line interpolation (intra-field interpolation) is made.

However, the motion-adaptive progressive scanning converter circuit has the following problems. In the moving image portion, scanning line interpolation is made based on the means value between vertically neighboring scanning lines. For this reason, the vertical resolution is not improved. In the still image portion, scanning line interpolation is made by the video signal before one field, so that the vertical resolution can be improved. However, when still portion moves once, the portion is interpolated based on the mean value between neighboring scanning lines, like the moving image portion. For this reason, the vertical resolution is reduced as compared with the still image state, and also, the degree of reduction is high. As a result, unnatural display video is provided.

On the other hand, there has been proposed a motion-compensation progressive scanning converter circuit, which interpolates scanning lines using frame and inter-field motion vector. Thus, the converter circuit is effective in solving the problems arisen in the motion-adaptive progressive scanning converter circuit. The problems are the reduction of the vertical resolution in the moving image portion and interlace artifact of the moving image portion. However, the motion-compensation progressive scanning converter circuit requires high accurate detection of the motion vector.

JPN. PAT. APPLN. KOKAI Publication No. 5-110997 discloses the following technique. According to the technique, comparison is made between an inter-field interpolation signal moving a pre-field image and a current field image signal based on a detected motion vector. Thereafter, it is determined whether or not the detected motion vector is valid (effective). If it is determined that the motion vector is effective, the inter-field interpolation signal moving a pre-field image is outputted. If it is determined that the motion vector is invalid, an intra-field interpolation signal is outputted.

In this case, whether the motion vector is valid or invalid is determined in the following manner. First, two absolute values are found. One is an absolute value of the difference between a pixel luminance on the current-field scanning line and a pixel luminance on an inter-field interpolated scanning line. Another is an absolute value of the difference between a pixel on the current field scanning line and a pixel on the current field scanning line positioned below one line. The absolute values thus found are compared with a value added in individual blocks. If the difference between two absolute values is smaller than a predetermined threshold value, it is determined that the motion vector is valid. If it is larger than a predetermined threshold value, it is determined that the motion vector is invalid.

According to the technique disclosed in the foregoing Publication No. 5-110997, the intra-field interpolation signal is generated via a vertical low-band filter. However, there is no band limitation with respect to the inter-field interpolation signal. For this reason, difference is generated in a vertical frequency band between these two. As a result, two interpolation signals having different vertical frequency band is changed over at the unit of block in accordance with the determination result of the motion vector. Thus, this is a factor of causing degradation of image quality such that the difference between vertical frequency bands looks like a block in one screen.

According to the technique of the same Publication as above, the current field image signal contains an aliasing distortion component by interlace. For this reason, if correlation is determined based on the interpolation signal and the current field image signal, there is a possibility of making an erroneous determination as to whether the detected motion vector has reliability.

According to the technique of the same Publication as above, whether the motion vector is valid or invalid is determined based on the comparison below. The difference between the current field scanning line and the interpolated scanning lines is compared with the difference signal between current field scanning lines. For this reason, there is a problem that correlation is accurately determined in an obliquely changing image.

JPN. PAT. APPLN. KOKAI Publication No. 2001-24987 discloses the following technique. According to the technique, degradation of a displayed image is reduced even if the detected motion vector is inaccurate. This serves to hold the image quality by motion compensation progressive scanning conversion. JPN. PAT. APPLN. KOKAI Publication No. 2003-32636 discloses the following technique. According to the technique, even if motion vector different from actual motion is detected in motion compensation scanning conversion, high-quality main scanning conversion preventing image degradation is realized. JPN. PAT. APPLN. KOKAI Publication No. 2001-54075 discloses the following technique. According to the technique, motion compensation and motion adaptive interpolation signals are selected in accordance with the reliability of motion compensation processing.

However, the foregoing Publications No 2001-24987, 2003-32636 and 2001-54075 have no any disclosures relevant to the technique of solving the problem described in the Publication No. 5-110997. That is the technique of solving the problem of the degradation of image quality based on the difference in vertical frequency band between intra-field and inter-field interpolation signals.

BRIEF SUMMARY OF THE INVENTION

According to one aspect of the present invention, there is provided a video signal processing apparatus comprising: a motion vector detecting section detecting a video motion vector from current-field and pre-field video signals or video signal before and after one field of the current-field video signal; a first interpolation signal generating section displacing the pre-field video signal at a unit of block in accordance with the motion vector to generate a first interpolation signal; a second interpolation signal generating section adding the current-field video signal to a vertical high-band component of the first interpolation to generate a second interpolation signal; a comparison reference signal generating section generating a comparison reference signal from the current-field video signal; and an output control section controlling the output of first and second interpolation signals based on a correlation between first and second interpolation signals and the comparison reference signal.

According to one aspect of the present invention, there is provided a video signal processing method comprising: detecting a video motion vector from current-field and pre-field video signals or video signal before and after one field of the current-field video signal; displacing the pre-field video signal at a unit of block in accordance with the motion vector to generate a first interpolation signal; adding the current-field video signal to a vertical high-band component of the first interpolation to generate a second interpolation signal; generating a comparison reference signal from the current-field video signal; and controlling the output of first and second interpolation signals based on a correlation between first and second interpolation signals and the comparison reference signal.

According to one aspect of the present invention, there is provided a video display apparatus comprising: a demodulating section demodulating an interlaced scanning video signal; a video signal processing section converting the demodulated video signal into a progressive scanning video signal, and controlling the output of first and second interpolation signals based on a correlation between the first and second interpolation signals and a comparison reference signal generated from a current-field video signal, the first interpolation signal being generated by displacing a pre-field video signal at a unit of block in accordance with the motion vector, the second interpolation signal being generated by adding the current-field video signal to a vertical high-band component of the first interpolation signal; and a display section displaying the interlaced scanning video signal outputted from a video signal processing section.

DETAILED DESCRIPTION OF THE INVENTION

Embodiments of the present invention will be detailedly described below with reference to the accompanying drawings.

Figure 1:
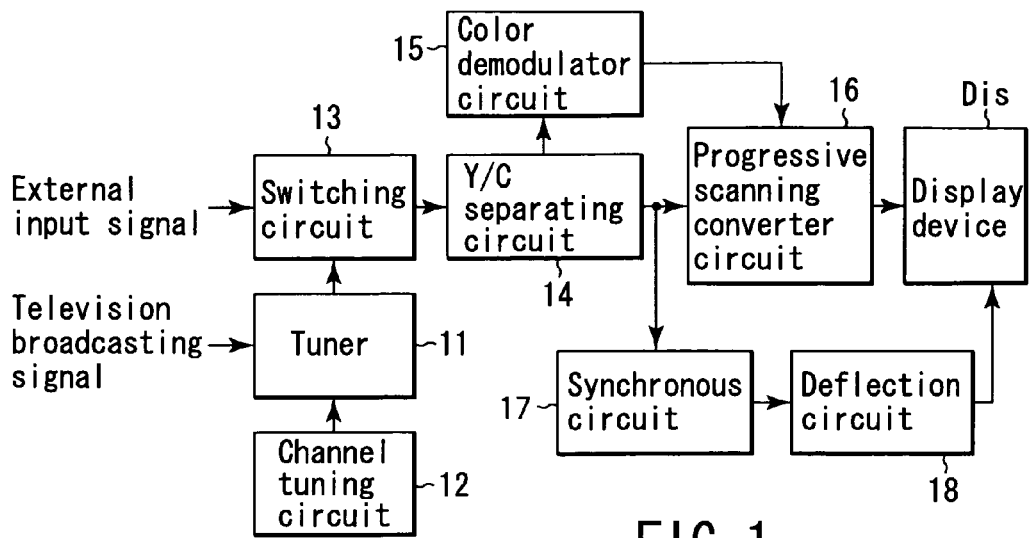
FIG. 1 shows a first embodiment of the present invention, and is a block diagram to schematically explain the configuration of a television broadcasting receiver.

FIG. 1 schematically shows the configuration of a television broadcasting receiver according to the first embodiment. A reference numeral 11 denotes a tuner, which is supplied with a television broadcasting signal received by an antenna.

The tuner 11 selects a desired channel signal from the inputted television broadcasting signal based on the control by a channel tuning circuit 12. The tuner 11 converts the selected signal into an intermediate frequency signal, and thereafter, outputs it to a switching circuit 13.

The switching circuit 13 selectively switches the signal supplied from the tuner 11 and an external input signal, and thereafter, outputs the switched signal. The signal selected by the switching circuit 13 is supplied to a Y/C separating circuit 14, and thereafter, separated into a luminance signal and a color signal.

The luminance signal is intactly supplied to a progressive scanning converter circuit 16 while the color signal is supplied thereto after being demodulated by a color demodulator circuit 15. By doing so, a progressive scanning video signal is generated.

A synchronous circuit 17 extracts a synchronizing signal from the output of the Y/C separating circuit 14. Thereafter, a deflection circuit 18 generates horizontal and vertical deflection signals based on the extracted synchronizing signal.

The video signal outputted from the progressive scanning converter circuit 16 and the deflection signal outputted from the deflection circuit 18 are supplied to a display device D is such as CRT (Cathode Ray tube). Thus, a video image is displayed.

Figure 2:
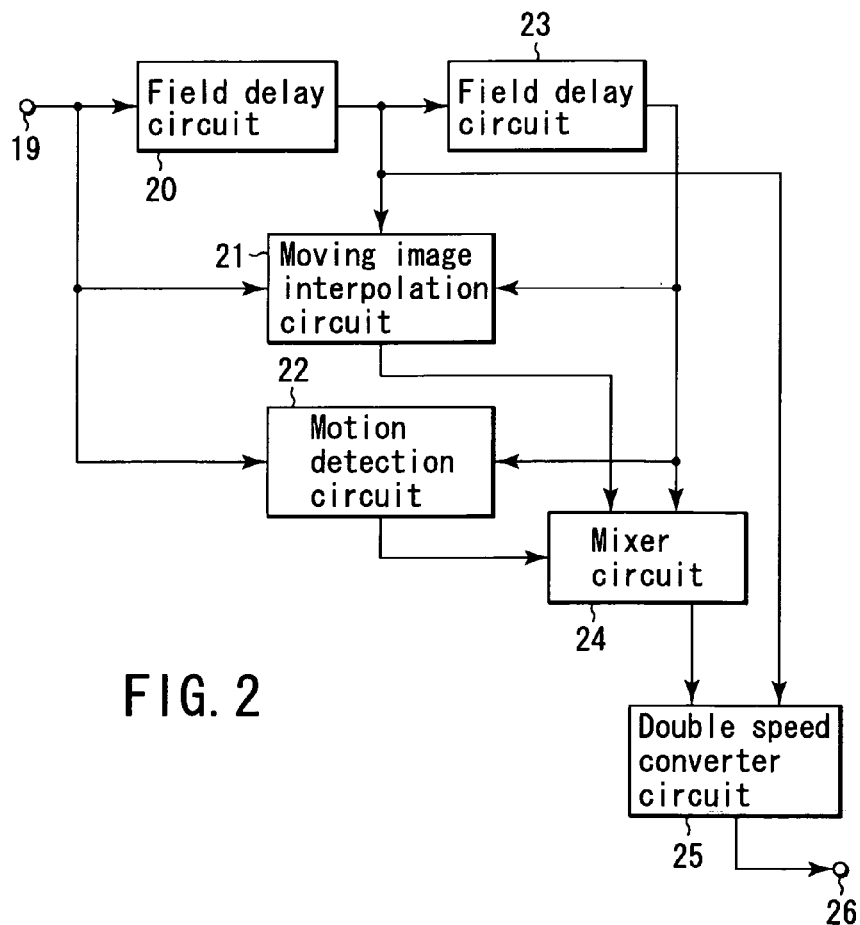
FIG. 2 is a block diagram to explain the configuration of a progressive scanning converter circuit in the first embodiment.

FIG. 2 shows the configuration of the progressive scanning converter circuit 16. A video signal inputted to an input terminal 19 is supplied to field delay circuit 20, moving image interpolation circuit 21 and motion detection circuit 22.

The output of the field delay circuit 20 is further supplied to a field delay circuit 23. The field delay circuits 20 and 23 delay the inputted video signal for one field period.

In this case, the video signal outputted from the field delay circuit 23 is called as a pre-field signal. The video signal outputted from the field delay circuit 20 is called as a current-field signal. The video signal inputted to the field delay circuit 20 is called as a post-field signal.

A moving image interpolation circuit 21 generates a moving image interpolation signal based on post-field, current-field and pre-field signals, and thereafter, outputs it to a mixer circuit 24. The mixer circuit 24 mixes the moving image interpolation signal and the pre-field signal.

The motion detection circuit 22 detects an inter-frame motion based on post-field and pre-field signals. The mixer circuit 24 is controlled according to the motion detection signal outputted from the motion detection circuit 22.

The output signal of the mixer circuit 24 and the current-field signal are supplied to a double speed converter circuit 25, and thereby, a progressive scanning video signal is generated. The progressive scanning video signal is outputted to the display device D is via an output terminal 26.

Figure 3:
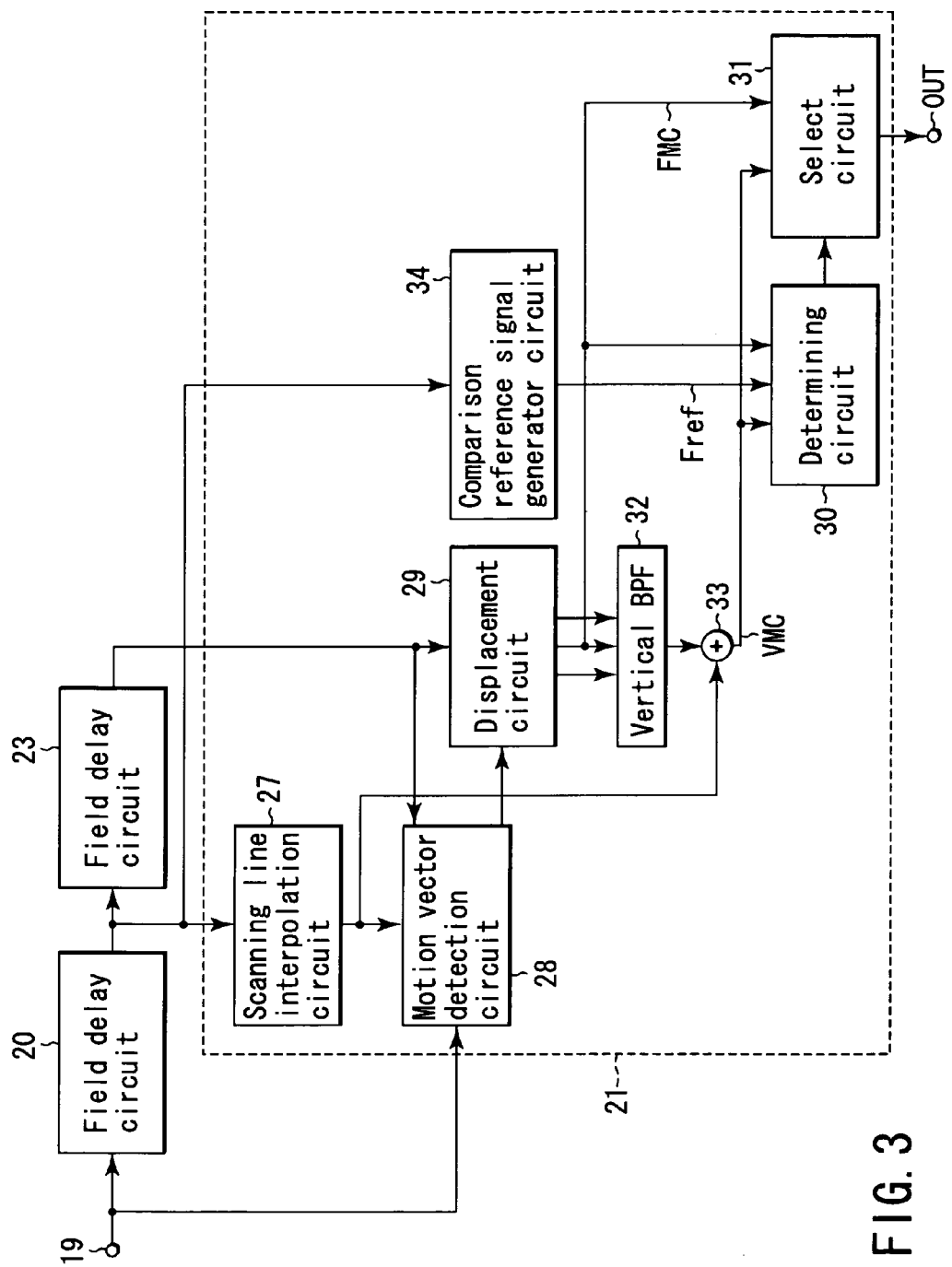
FIG. 3 is a block diagram to explain the configuration of a moving image interpolation circuit in the first embodiment.

FIG. 3 shows the configuration of the moving image interpolation circuit 21. The video signal supplied to the input terminal 19 is an interlace signal. For this reason, a scanning line interpolation circuit 27 interpolates a scanning line in an interpolative position between vertical scanning lines with respect to the current-field signal.

A motion vector detection circuit 28 is supplied with the output signal of the scanning line interpolation circuit 27, pre-field signal and post-field signal. The detection circuit 28 detects a video motion vector between the output signal of the scanning line interpolation circuit 27 and the pre-field signal or between pre-field and post-field signals.

The motion vector detected by the motion vector detection circuit 28 is supplied to a displacement circuit 29. The displacement circuit 29 generates a motion compensation field signal FMC displacing the pre-field signal at the unit of block based on the motion vector. Thereafter, the displacement circuit 29 outputs the generated signal to a determining circuit 30 and select circuit 31.

The displacement circuit 29 displaces the motion compensation field signal FMC, that is, the vertical scanning line pixel of the interpolation pixel of the pre-field signal, and thereafter, outputs it. The interpolation pixel and the vertical pixel are supplied to a vertical BPF (Band Pass Filter) 32 to be generated as a vertical high-band signal, and thereafter, outputted to an adder 33.

The adder 33 adds the vertical high-band signal and the output signal of the scanning line interpolation circuit 27 to generate a high-band compensation signal VMC. Thereafter, the adder 33 outputs the generated signal to the determining circuit 30 and the select circuit 31.

The current-field signal is supplied to a comparison reference signal generator circuit 34, and thereafter, used to generate a comparison reference signal Fref. The comparison reference signal Fref is supplied to the determining circuit 30.

Based on the determination result made by the determining circuit 30, the select circuit 31 selects the high-band compensation signal VMC or the motion compensation field signal FMC. The signal thus selected is outputted as a moving image interpolation signal from an output terminal OUT.

Figure 4:
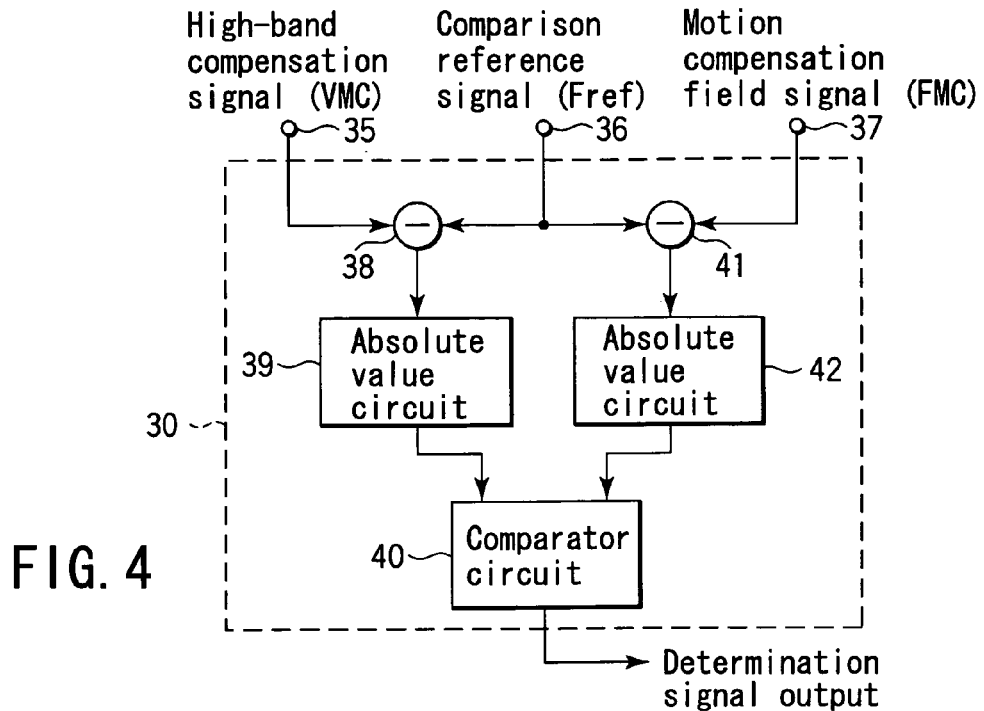
FIG. 4 is a block diagram to explain the configuration of a determination circuit in the first embodiment.

FIG. 4 shows the configuration of the determining circuit 30. The determining circuit 30 is supplied with high-band compensation signal VMC, comparison reference signal Fref and motion compensation field signal FMC via input terminals 35 to 37.

The high-band compensation signal VMC and the comparison reference signal Fref are supplied to a subtracter 38 so that a difference signal can be outputted. The difference signal is supplied to a comparator circuit 40 via an absolute value circuit 39.

The comparison reference signal Fref and the motion compensation field signal FMC are supplied to a subtracter 41 so that a difference signal can be outputted. The difference signal is supplied to the comparator circuit 40 via an absolute value circuit 42.

The comparator circuit 40 outputs a determination signal for selecting the high-band compensation signal VMC by the select circuit 31 if the following condition is given. That is, the difference absolute value between high-band compensation signal VMC and comparison reference signal Fref is smaller than that between comparison reference signal Fref and motion compensation field signal EMC.

Conversely, the comparator circuit 40 outputs a determination signal for selecting the motion compensation field signal FMC by the select circuit 31 if the following condition is given. That is, the difference absolute value between high-band compensation signal VMC and comparison reference signal Fref is larger than that between comparison reference signal Fref and motion compensation field signal FMC.

In other words, of, the select circuit 31 selects either high-band compensation signal VMC or motion compensation field signal FMC, which has the following condition as a moving image interpolation signal. According to the select condition, the selected signal has a smaller difference absolute value between the signals described above and the comparison reference signal Fref. By doing so, a signal having higher correlation to the comparison reference signal Fref is selected out of the signals VMC and FMC. Therefore, the difference of the vertical resolution by the difference in vertical frequency band between intra-field and inter-field interpolation signals is reduced. As a result, image-quality degradation can be prevented.

Figure 5:
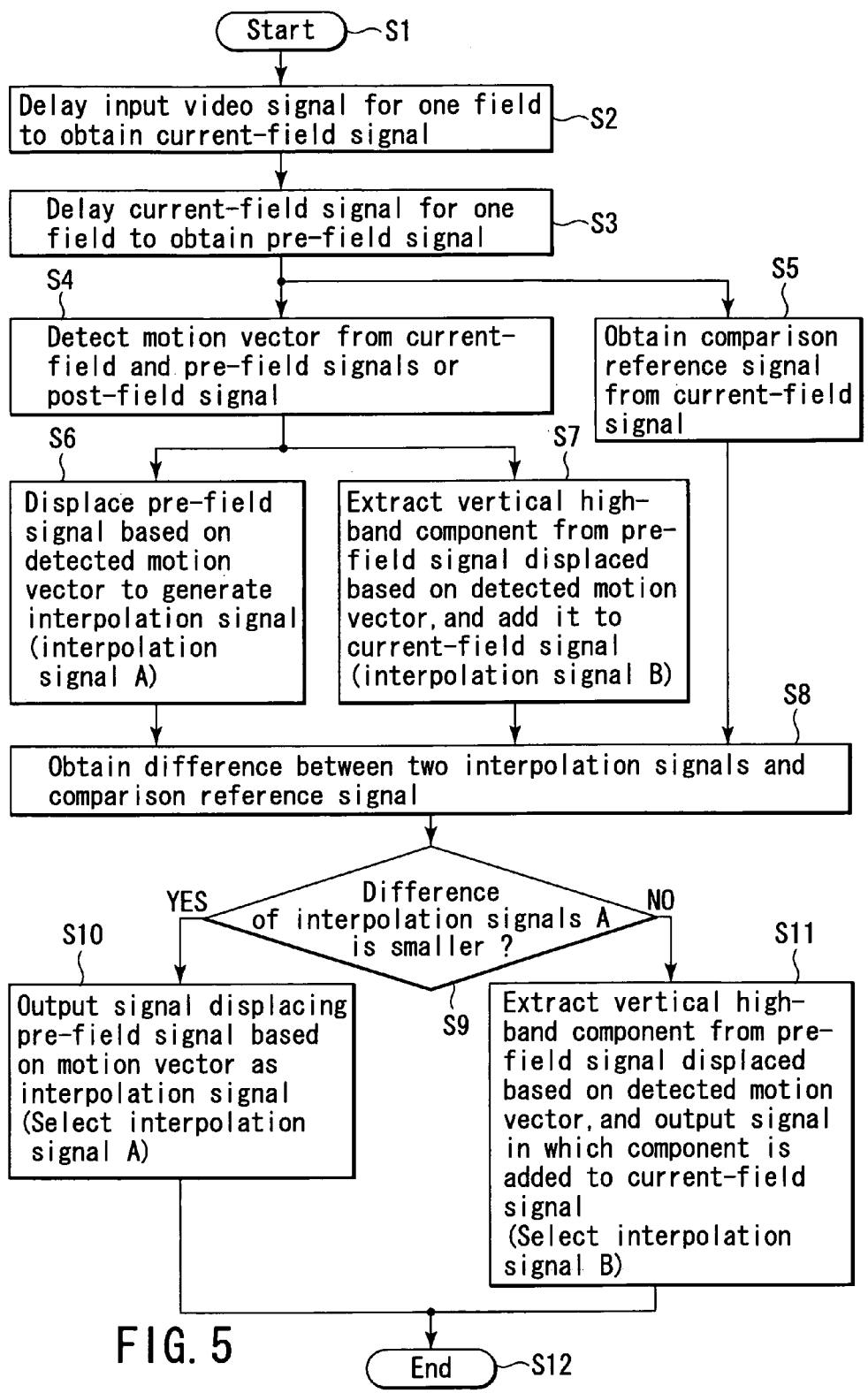
FIG. 5 is a flowchart to explain the operation of the moving image interpolation circuit in the first embodiment.

FIG. 5 shows a flowchart to explain the operation of the moving image interpolation circuit 21. When the operation is started (step S1), the field delay circuit 20 delays a video signal inputted to the input terminal 19 for one field period to obtain a current-field signal in step S2.

In step S3, the field delay circuit 23 delays the current-field signal for one field period to obtain a pre-field signal.

Thereafter, the motion detection circuit 28 detects a motion vector from current-filed, pre-field or post-field signals in step S4. Simultaneously, the comparison reference signal generator circuit 34 obtains a comparison reference signal Fref from the current-field signal in step S5.

In step S6, the displacement circuit 29 displaces the pre-field signal based on the motion vector to generate a motion compensation field signal FMC. The signal FMC is generated as an interpolation signal A.

In step S7, the vertical BPF 32 extracts a vertical high-band component from the pre-field signal displaced by the displacement circuit 29 extracts based on the motion vector. The adder 33 adds the components to the current-field signal, and thereby, generates a high-band compensation signal VMC. The signal VMC is generated as an interpolation signal B.

Thereafter, in step S8, the determining circuit 30 calculates two differences. One is the difference between the signal FMC (interpolation signal A) and the comparison reference signal Fref. Another is the difference between the signal VMC (interpolation signal B) and the comparison reference signal Fref. In step S9, it is determined whether or not the difference between the interpolation signal A and the comparison reference signal Fref is smaller.

If the difference between the motion compensation field signal FMC (interpolation signal A) and the signal Fref is smaller (YES), the signal FMC (interpolation signal A) is selected in step S10. Then, the process sequence ends (step S12).

If the difference between the signal FMC (interpolation signal A) and the signal Fref is not small (NO), the high-band compensation signal VMC (interpolation signal B) is selected in step S11. Then, the process sequence ends (step S12).

Figure 6:
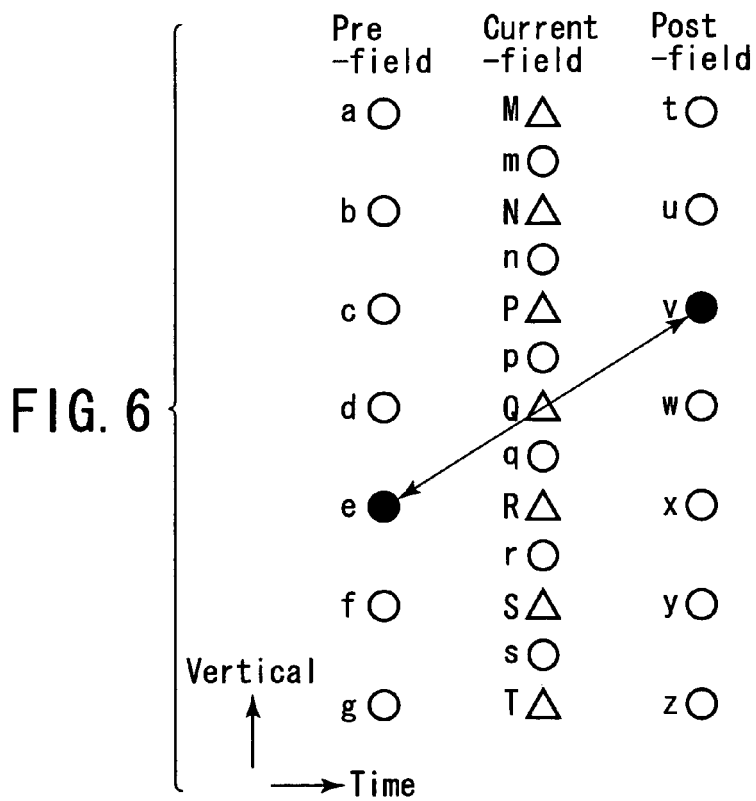
FIG. 6 is a view to explain the operation of the moving image interpolation circuit in the first embodiment.

FIG. 6 shows a video that a black line displaces upwardly from below on the screen. The operation of the moving image interpolation circuit 21 will be explained below using the video as one example. In FIG. 6, transmitted scanning lines are represented by a symbol ○.

The motion vector detection circuit 28 detects a motion vector from pixel e to v with respect to the interpolation pixel Q. The displacement circuit 29 outputs the pixel e as the motion compensation field signal FMC.

In FIG. 6, the luminance Ye of the motion compensation field signal EMC is the luminance Ye of the pixel e. Thus, the luminance Yvc of the high-band compensation signal VMC is obtained from the following equation.

$$Yvc = [(Yp+Yq)/2] + [(-Yd+2Ye-Yf)/4]$$

In the equation, Yp, Yq, Yd, Ye and Yf denote a luminance of pixels p, q, d, e and f, respectively.

The luminance Yref of the comparison reference signal Fref is obtained from the following equation.

$$Yref = (Yp+Yq)/2$$

Thus, the comparison is made between |Yref−Ye| and −Yref−Yvc|.

Here, if the condition of Yp=Yq=Yd=Yf is given; the following equations are obtained.

$$Yref - Ye = [(Yp+Yq)/2] - Ye$$
$$= Yd - Ye$$
$$Yref - Yvc = [(Yp+Yq)/2] - [(Yp+Yq)/2] +$$
$$[(-Yd+2Ye-Yf)/4]$$
$$= (-Yd+2Ye-Yf)/4$$
$$= (Ye-Yd)/2$$

Thus, the relation |Yref−Yvc|<|Yref−Ye| is established; therefore, the select circuit 31 outputs the high-band compensation signal VMC. By doing so, a signal passing pixels d, e and f through the vertical BPF 32 and adding the current-field signal thereto is interpolated in the pixel Q. Consequently, line flicker can be reduced.

Figure 7:
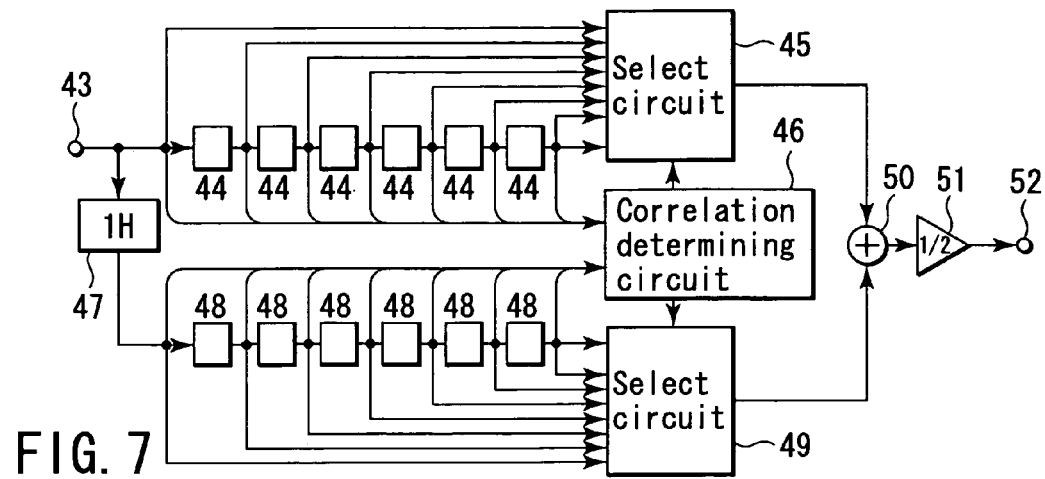
FIG. 7 is a block diagram to explain the configuration of a comparison reference signal generator circuit in the first embodiment.

FIG. 7 shows the configuration of the comparison reference signal generator circuit 34. More specifically, the current-field signal inputted to an input terminal 43 is successively delayed by several series-connected delay elements 44 (six in FIG. 7). A signal before being delayed by the delay elements 44 and output signals of these elements 44 are supplied to a select circuit 45 and a correlation determining circuit 46.

The current-field signal inputted to the input terminal 43 is delayed by a 1H delay circuit 47 for one line period, thereafter, successively delayed by several series-connected delay elements 48 (six in FIG. 7). A signal before being delayed by the delay elements 48 and output signals of these elements 44 are supplied to a select circuit 49 and the correlation determining circuit 46.

The correlation determining circuit 46 controls the select circuits 45 and 49 so that a pixel pair having the closest correlation can be fetched. In this case, the foregoing pixel pair is fetched from pixel pairs, which are point symmetrical with respect to the interpolation pixel on the vertical scanning line. Each pixel selected by the select circuits 45 and 49 is added by an adder 50, and averaged through a ½-coefficient unit 51. Thereafter, the selected pixel is outputted as a comparison reference signal Fref from an output terminal 52.

Figure 8:
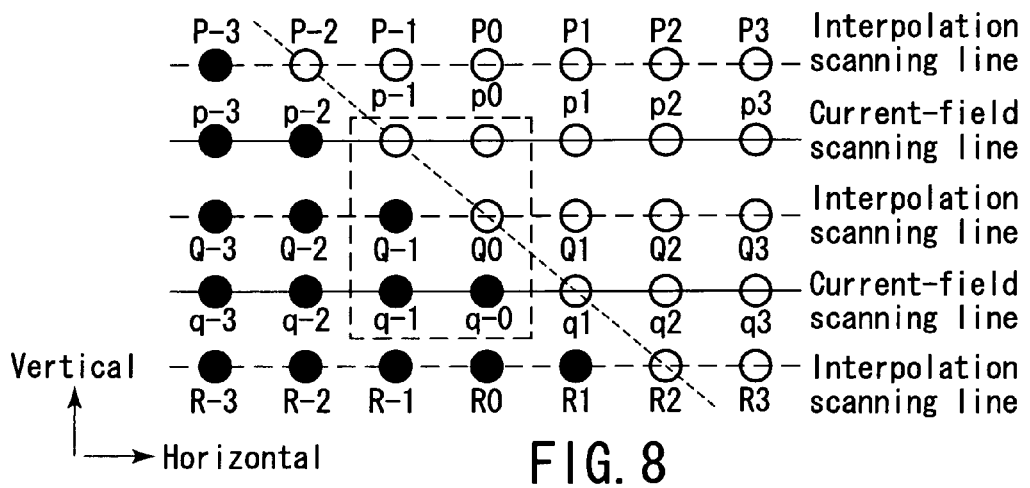
FIG. 8 is a view to explain the operation of a correlation determining circuit in the first embodiment.

FIG. 8 is a view to explain the operation of the correlation determining circuit 46. The correlation determining circuit 46 controls the select circuits 45 and 49 in the following manner. More specifically, the select circuits 45 and 49 detect a pixel pair having the smallest difference value, and output the pixel pair. In this case, the select circuits 45 and 49 detect the pixel pair from the following difference absolute values of seven pixel pairs, which have positional relation of point symmetry with respect to the interpolation pixel Q0. The difference absolute values of seven pixel pairs are [p0−q0|, |p1−q-1|, |p-1−q1|, |p2−q-2|, |p-2−q2|, |p3−q-3| and |p-3−q3|.

FIG. 8 is a view to explain the operation of the correlation determining circuit 46. In FIG. 8, a solid line shows the current-field scanning lines, and a broken line shows filed-interpolated scanning lines.

As seen from FIG. 8, the pixel pair (p-1−q1) has the smallest difference with respect to the interpolation pixel Q0 in the foregoing seven pixel pairs. Therefore, (p-1−q1)/2 is outputted as the comparison reference signal Fref from the output terminal 52.

On the other hand, the motion compensation field signal FMC is Q0, and the high-band compensation signal VMC is (p0+q0) 2+[(−P0+2Q0−R0)/4].

The determining circuit 30 shown in FIG. 4 makes the comparison between the following difference absolute values based on high-band compensation signal, comparison reference signal and motion compensation field signal.

|Q0−[(p0+q0)2]+[(−P0+2Q0−R0)/4]|

|Q0−[(p-1+q1)/2]|

As a result, the following relation is given.

|(p0+q0)2+[(−P0+2Q0−R0)/4]−[(p-1+q1)/2]|>|Q0−[(p-1+q1)/2]|

Thus, the select circuit 31 shown in FIG. 3 outputs the pixel Q0 as the motion compensation field signal FMC. Consequently, it is possible prevent the reduction of the vertical resolution on the boundary shown by the oblique broken line in the image of FIG. 8.

Figure 9:
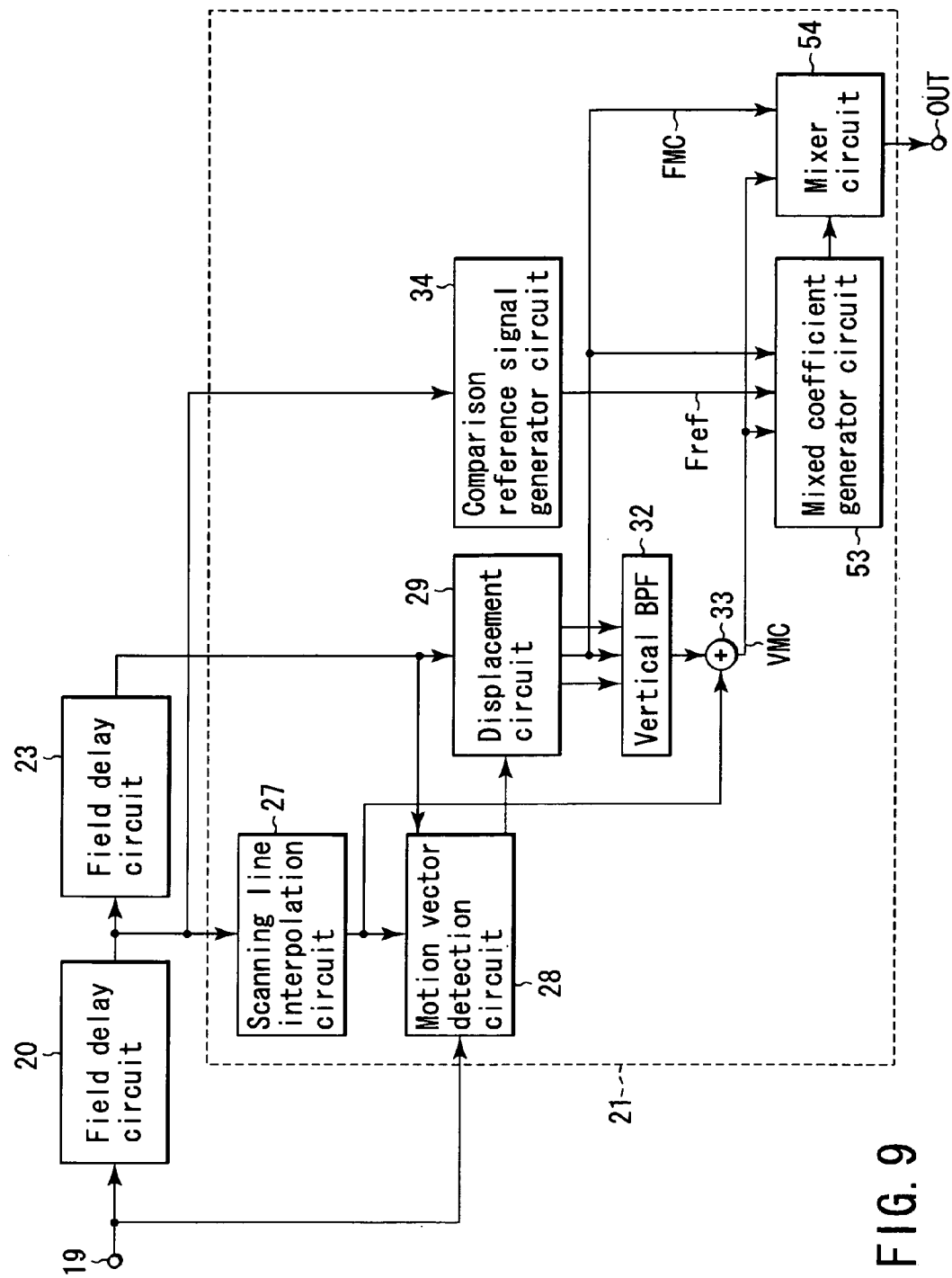
FIG. 9 shows a second embodiment of the present invention, and is a block diagram to explain the configuration of a moving image interpolation circuit.

FIG. 9 shows (the configuration of a moving image interpolation circuit according to) the second embodiment of the present invention. In FIG. 9, the same reference numerals are used to designate the components identical to FIG. 3.

The second embodiment differs from the configuration shown in FIG. 3 in the following point. A mixed coefficient generator circuit 53 is used in place of the determining circuit 30, and a mixer circuit 54 is used in place of the select circuit 31.

In this case, the mixer circuit 54 outputs the following signal as a moving image interpolation signal. The signal is generated by mixing motion compensation field signal FMC and high-band compensation signal VMC at a predetermined mixing ratio based on a mixed coefficient k obtained from the mixed coefficient generator circuit 53.

Figure 10:
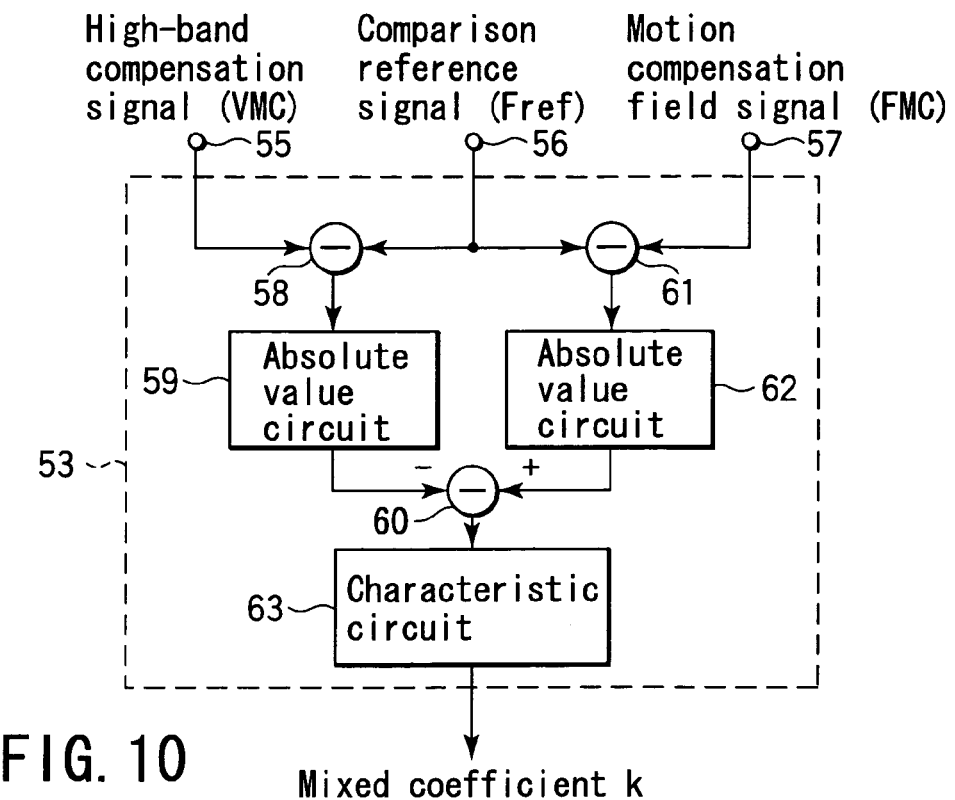
FIG. 10 is a block diagram to explain the configuration of a mixed coefficient generator circuit in the second embodiment.

FIG. 10 shows the configuration of the mixed coefficient generator circuit 53. More specifically, the mixed coefficient generator circuit 53 is supplied with high-band compensation signal VMC, comparison reference signal Fref and motion compensation field signal FMC via input terminals 55 to 57.

The foregoing high-band compensation signal VMC and comparison reference signal Fref are supplied to a subtracter 58 so that a difference signal can be outputted. The difference signal is supplied to a subtracter 60 via an absolute value circuit 59.

The foregoing comparison reference signal Fref and motion compensation field signal FMC are supplied to a subtracter 61 so that a difference signal can be outputted. The difference signal is supplied to the subtracter 60 via an absolute value circuit 62.

The subtracter 60 generates a difference signal between the outputs of the absolute value circuits 59 and 62, and thereafter, outputs it to a characteristic circuit 63. The characteristic circuit 63 outputs a mixing coefficient k corresponding to the inputted difference signal.

Figure 11:
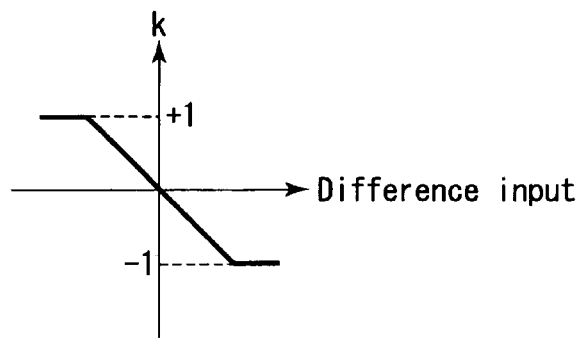
FIG. 11 is a characteristic diagram to explain input-output characteristics of a characteristic circuit in the second embodiment.

FIG. 11 shows input-output characteristics of the characteristic circuit 63. The output Y of the mixer circuit 54 corresponding to the mixed coefficient k is as follows.

$$Y=[(1-k)/2]\cdot VMC+[(1+k)/2]\cdot FMC$$

In other words, setting is made so that the ratio of mixing the signal VMC increases when the output difference between absolute value circuits 59 and 62 becomes large and the mixed coefficient k is gradually close to −1.

According to the second embodiment, multi-valued mixing is carried out with respect to motion compensation field signal FMC and high-band compensation signal VMC. Therefore, the boundary between two signals can be further smoothened in addition to the effect of the first embodiment.

Figure 12:
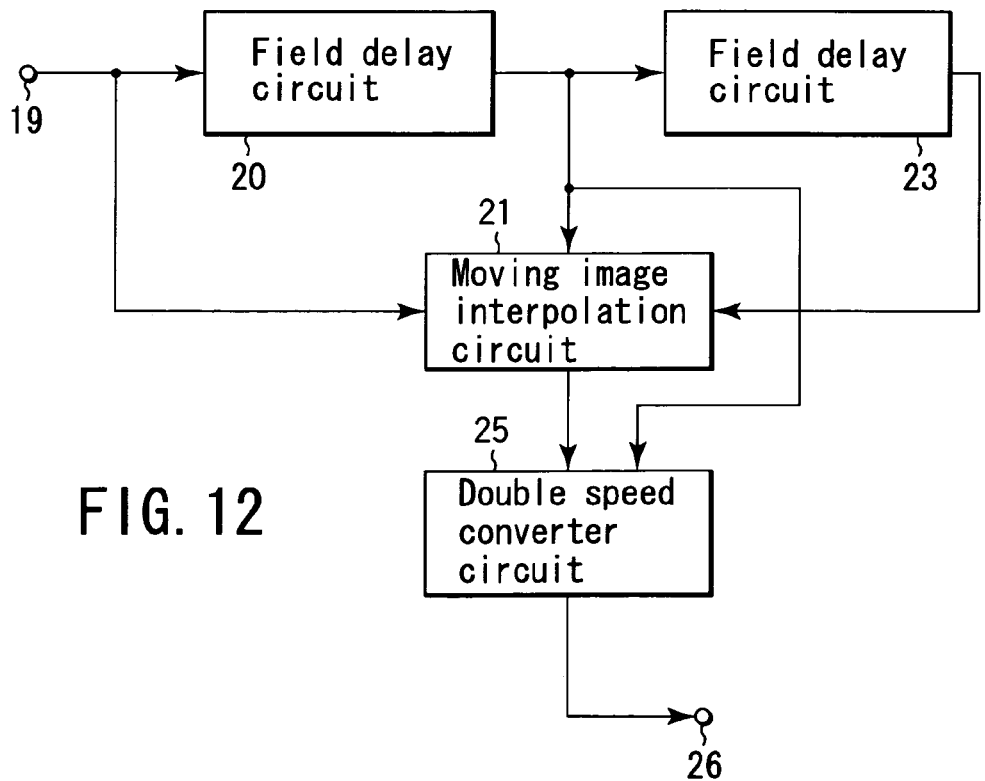
FIG. 12 shows a third embodiment of the present invention, and is a block diagram to explain the configuration of a progressive scanning converter circuit.

FIG. 12 shows (the configuration of the progressive scanning converter circuit according to) the third embodiment of the present invention. In FIG. 12, the same reference numerals are used to designate the components identical to FIG. 2. The second embodiment differs from the configuration shown in FIG. 2 in the following point. The motion detection circuit 22 and the mixer circuit 24 are deleted, and the output of the moving image interpolation circuit 21 is directly supplied to the double speed converter circuit 25.

More specifically, the double speed converter circuit 25 inputs an interpolation signal outputted from the moving image interpolation circuit 21 and the current-field signal. The signals are converted at double speed, and alternately outputted, thereby obtaining a progressive scanning video signal.

The present invention is not limited to the embodiments described above, and various modifications of components may be made without departing from the spirit or scope of the general inventive concept. Several components disclosed in the foregoing embodiments are properly combined, and thereby, various inventions may be made. For example, some components may be deleted from all components shown in the embodiments. Components according to different embodiment may be properly combined.

What is claimed is:

1. A video signal processing apparatus comprising:
   a motion vector detecting section detecting a video motion vector from current-field and pre-field video signals or video signal before and after one field of the current-field video signal;
   a first interpolation signal generating section displacing the pre-field video signal at a unit of block in accordance with the motion vector to generate a first interpolation signal;
   a second interpolation signal generating section adding the current-field video signal to a vertical high-band component of the first interpolation to generate a second interpolation signal;
   a comparison reference signal generating section generating a comparison reference signal from the current-field video signal; and
   an output control section controlling the output of first and second interpolation signals based on a correlation between first and second interpolation signals and the comparison reference signal.

2. The apparatus according to claim 1, wherein the second interpolation signal generating section includes:
   a filter extracting a vertical high-band component from the first interpolation signal; and
   an adder section adding the current-field video signal to an output signal of the filter.

3. The apparatus according to claim 1, wherein the second interpolation signal generating section displaces vertical scanning line pixels of an interpolation pixel of the pre-field video signal at a unit of block.

4. The apparatus according to claim 1, wherein the output control section selects and outputs either of the first and second interpolation signals having a higher correlation with respect to the comparison reference signal.

5. The apparatus according to claim 1, wherein the output control section compares a difference between the first interpolation signal and the comparison reference signal with a difference between the second interpolation signal and the comparison reference signal, and selects and outputs an interpolation signal having a smaller difference.

6. The apparatus according to claim 1, wherein the output control section mixes and outputs the first and second interpolation signals at a mixing ratio based on a correlation between first and second interpolation signals and the comparison reference signal.

7. The apparatus according to claim 1, wherein the output control section mixes and outputs the first and second interpolation signals at a mixing ratio based on a difference between the difference between the first interpolation signal and the comparison reference signal and the difference between the second interpolation signal and the comparison reference signal.

8. The apparatus according to claim 1, wherein the output control section mixes and outputs the first and second interpolation signals so that a ratio of mixing the first interpolation signal increases when an absolute value of the difference between the second interpolation signal between the comparison reference signal becomes gradually larger than an absolute value of the difference between the first interpolation signal between the comparison reference signal.

9. The apparatus according to claim 1, wherein the comparison reference signal generating section selects a high correlation pixel pair of several pixel pairs, which are point symmetrical with respect to an interpolation pixel, from current-filed scanning lines vertically neighboring to an interpolation scanning line, and outputs a means value of the selected pixel pair as the comparison reference signal.

10. A video signal processing method comprising:
   detecting a video motion vector from current-field and pre-field video signals or video signal before and after one field of the current-field video signal;
   displacing the pre-field video signal at a unit of block in accordance with the motion vector to generate a first interpolation signal;
   adding the current-field video signal to a vertical high-band component of the first interpolation to generate a second interpolation signal;
   generating a comparison reference signal from the current-field video signal; and
   controlling the output of first and second interpolation signals based on a correlation between first and second interpolation signals and the comparison reference signal.

11. The method according to claim 10, wherein controlling the output of first and second interpolation signals based on a correlation between first and second interpolation signals and the comparison reference signal is to compare a difference between the first interpolation signal and the comparison reference signal with a difference between the second interpolation signal and the comparison reference signal, and to select and output an interpolation signal having a smaller difference.

12. The method according to claim 10, wherein controlling the output of first and second interpolation signals based on a correlation between first and second interpolation signals and the comparison reference signal is to mix and output the first and second interpolation signals at a mixing ratio based on a difference between the difference between the first interpolation signal and the comparison reference signal and the difference between the second interpolation signal and the comparison reference signal.

13. The method according to claim 10, wherein controlling the output of first and second interpolation signals based on a correlation between first and second interpolation signals and the comparison reference signal is to mix and output the first and second interpolation signals so that a ratio of mixing the first interpolation signal increases when an absolute value of the difference between the second interpolation signal between the comparison reference signal becomes gradually larger than an absolute value of the difference between the first interpolation signal between the comparison reference signal.

14. The method according to claim 10, wherein generating a comparison reference signal from the current-field video signal is to select a high correlation pixel pair of several pixel pairs, which are point symmetrical with respect to an interpolation pixel, from current-filed scanning lines vertically neighboring to an interpolation scanning line, and to output a means value of the selected pixel pair as the comparison reference signal.

15. A video display apparatus comprising:
   a demodulating section demodulating an interlaced scanning video signal;
   a video signal processing section converting the demodulated video signal into a progressive scanning video signal, and controlling the output of first and second interpolation signals based on a correlation between the first and second interpolation signals and a comparison reference signal generated from a current-field video signal, said first interpolation signal being generated by displacing a pre-field video signal at a unit of block in accordance with the motion vector, said second interpolation signal being generated by adding the current-field video signal to a vertical high-band component of the first interpolation signal; and
   a display section displaying the interlaced scanning video signal outputted from a video signal processing section.

* * * * *